(12) United States Patent
Poilasne

(10) Patent No.: US 12,046,905 B2
(45) Date of Patent: Jul. 23, 2024

(54) MULTI-TECHNOLOGY GRID REGULATION SERVICE

(71) Applicant: Nuvve Corporation, San Diego, CA (US)

(72) Inventor: Gregory Poilasne, San Diego, CA (US)

(73) Assignee: Nuvve Corporation, San Diego, CA (US)

( * ) Notice: Subject to any disclaimer, the term of this patent is extended or adjusted under 35 U.S.C. 154(b) by 746 days.

(21) Appl. No.: 16/832,903

(22) Filed: Mar. 27, 2020

(65) Prior Publication Data

US 2020/0307402 A1 Oct. 1, 2020

Related U.S. Application Data

(60) Provisional application No. 62/825,664, filed on Mar. 28, 2019.

(51) Int. Cl.
*H02J 3/32* (2006.01)
*H02J 7/00* (2006.01)

(52) U.S. Cl.
CPC ............ *H02J 3/322* (2020.01); *H02J 7/0069* (2020.01); *H02J 2203/10* (2020.01)

(58) Field of Classification Search
CPC ...... H02J 3/322; H02J 7/0069; H02J 2203/10; H02J 2310/48; H02J 2310/60; Y02T 10/70; Y02T 10/7072; Y02T 90/12; Y02T 90/14

See application file for complete search history.

(56) References Cited

U.S. PATENT DOCUMENTS

| | | | |
|---|---|---|---|
| 4,617,506 A | 10/1986 | Bogie et al. | |
| 4,770,841 A | 9/1988 | Haley | |
| 5,499,181 A | 3/1996 | Smith | |

(Continued)

FOREIGN PATENT DOCUMENTS

| | | |
|---|---|---|
| CA | 2697015 A1 | 1/2009 |
| CN | 1405944 A | 3/2003 |

(Continued)

OTHER PUBLICATIONS

International Preliminary Report on Patentability in corresponding International Patent Application No. PCT/US2020/025489, dated Sep. 28, 2021, in 7 pages.

(Continued)

*Primary Examiner* — Ziaul Karim
(74) *Attorney, Agent, or Firm* — Snell & Wilmer L.L.P.

(57) ABSTRACT

Certain aspects of the present disclosure provide a method for providing a grid regulation service, including: determining a preferred operating point for use with one or more grid regulation resources of a first type; determining a predicted regulation up capacity and a predicted regulation down capacity of the one or more grid regulation resources of the first type for the grid regulation service period; commencing the grid regulation service period based on an indication; performing a grid regulation service during the grid regulation service period by varying a power delivery rate of the one or more grid regulation resources of the first type; and enabling one or more grid regulation resources of a second type to participate in the grid regulation service during the grid regulation service period.

18 Claims, 5 Drawing Sheets

(56) References Cited

U.S. PATENT DOCUMENTS

| | | | |
|---|---|---|---|
| 5,572,109 A | 11/1996 | Keith | |
| 5,583,418 A | 12/1996 | Honda | |
| 5,598,084 A | 1/1997 | Keith | |
| 5,767,584 A | 6/1998 | Gore et al. | |
| 6,028,537 A | 2/2000 | Suman et al. | |
| 6,081,205 A | 6/2000 | Williams | |
| 6,087,806 A | 7/2000 | Fujioka | |
| 6,107,691 A | 8/2000 | Gore et al. | |
| 6,356,877 B1 | 3/2002 | Schulden | |
| 6,614,204 B2 | 9/2003 | Pellegrino et al. | |
| 6,925,361 B1 | 8/2005 | Sinnock | |
| 7,013,205 B1 | 3/2006 | Hafner et al. | |
| 7,040,430 B2 | 5/2006 | Nomura | |
| 7,274,975 B2 | 9/2007 | Miller | |
| 7,443,049 B1 | 10/2008 | Jones et al. | |
| 7,550,861 B2 | 6/2009 | Oyobe | |
| 7,565,224 B2 | 7/2009 | Fairlie | |
| 7,582,979 B2 | 9/2009 | Oyobe | |
| 7,590,472 B2 | 9/2009 | Hakim et al. | |
| 7,612,466 B2 | 11/2009 | Skutt | |
| 7,740,092 B2 | 6/2010 | Bender | |
| 7,783,390 B2 | 8/2010 | Miller | |
| 7,792,613 B2 | 9/2010 | Kressner | |
| 8,019,483 B2 | 9/2011 | Keefe | |
| 8,116,915 B2 | 2/2012 | Kempton et al. | |
| 8,154,246 B1 | 4/2012 | Heitmann | |
| 8,508,187 B2 | 8/2013 | Chiang et al. | |
| 8,509,976 B2 | 8/2013 | Kempton et al. | |
| 9,043,038 B2 | 5/2015 | Kempton | |
| 9,754,300 B2 | 9/2017 | Kempton et al. | |
| 2004/0110044 A1 | 6/2004 | McArthur | |
| 2005/0107989 A1 | 5/2005 | Henriksen et al. | |
| 2006/0250902 A1 | 11/2006 | Bender et al. | |
| 2007/0068714 A1 | 3/2007 | Bender | |
| 2007/0271006 A1 | 11/2007 | Golden et al. | |
| 2007/0282495 A1 | 12/2007 | Kempton et al. | |
| 2008/0039980 A1 | 2/2008 | Pollack et al. | |
| 2008/0167756 A1 | 7/2008 | Golden et al. | |
| 2008/0218104 A1 | 9/2008 | Lukic et al. | |
| 2008/0281663 A1 | 11/2008 | Hakim et al. | |
| 2009/0030712 A1 | 1/2009 | Bogolea et al. | |
| 2009/0062967 A1 | 3/2009 | Kressner et al. | |
| 2009/0088915 A1 | 4/2009 | Kizaki | |
| 2009/0091291 A1 | 4/2009 | Woody et al. | |
| 2009/0177595 A1 | 7/2009 | Dunlap et al. | |
| 2009/0189456 A1 | 7/2009 | Skutt | |
| 2009/0210357 A1 | 8/2009 | Pudar et al. | |
| 2009/0222143 A1 | 9/2009 | Kempton | |
| 2009/0224939 A1 | 9/2009 | Stocker et al. | |
| 2009/0228388 A1 | 9/2009 | Axelrod et al. | |
| 2009/0229900 A1 | 9/2009 | Hafner | |
| 2009/0259603 A1 | 10/2009 | Housh | |
| 2009/0313033 A1 | 12/2009 | Hafner | |
| 2009/0313103 A1 | 12/2009 | Ambrosio et al. | |
| 2010/0017045 A1 | 1/2010 | Nesler et al. | |
| 2010/0017249 A1 | 1/2010 | Fincham et al. | |
| 2010/0114798 A1 | 5/2010 | Sirton | |
| 2010/0161393 A1 | 6/2010 | Littrell | |
| 2010/0161481 A1 | 6/2010 | Littrell | |
| 2010/0211643 A1 | 8/2010 | Lowenthal et al. | |
| 2010/0274570 A1 | 10/2010 | Proefke et al. | |
| 2011/0001356 A1* | 1/2011 | Pollack | H02J 3/381 |
| | | | 307/31 |
| 2011/0099111 A1 | 4/2011 | Levy et al. | |
| 2011/0202192 A1* | 8/2011 | Kempton | H02J 3/008 |
| | | | 320/109 |
| 2011/0276194 A1* | 11/2011 | Emalfarb | B60L 53/66 |
| | | | 700/297 |
| 2012/0029720 A1 | 2/2012 | Cherian et al. | |
| 2012/0089523 A1 | 4/2012 | Hurri et al. | |
| 2012/0253567 A1 | 10/2012 | Levy et al. | |
| 2013/0039104 A1 | 2/2013 | Sharma | |
| 2013/0043721 A1* | 2/2013 | Peitzke | F03G 7/00 |
| | | | 307/9.1 |
| 2013/0113413 A1 | 5/2013 | Harty | |
| 2014/0018969 A1 | 1/2014 | Forbes, Jr. | |
| 2014/0039709 A1 | 2/2014 | Steven et al. | |
| 2014/0067151 A1 | 3/2014 | Erhart et al. | |
| 2014/0304025 A1 | 10/2014 | Steven et al. | |
| 2014/0312841 A1 | 10/2014 | Baba | |
| 2015/0066231 A1* | 3/2015 | Clifton | H02J 3/381 |
| | | | 307/46 |
| 2016/0248263 A1 | 8/2016 | Hunt et al. | |
| 2018/0037121 A1 | 2/2018 | Narla | |
| 2019/0050949 A1* | 2/2019 | Orsini | H02J 3/381 |
| 2019/0184850 A1 | 6/2019 | Lee et al. | |
| 2019/0288347 A1* | 9/2019 | Yokoyama | B60L 50/60 |
| 2021/0011439 A1 | 1/2021 | Goverde et al. | |
| 2021/0316637 A1 | 10/2021 | Slepchenkov et al. | |
| 2022/0043038 A1 | 2/2022 | Matan et al. | |
| 2022/0383429 A1 | 12/2022 | Poilasne et al. | |

FOREIGN PATENT DOCUMENTS

| | | |
|---|---|---|
| CN | 106203720 A | 12/2016 |
| JP | H07-123599 A | 5/1995 |
| JP | 2003-259636 | 9/2003 |
| JP | 2003-259696 A | 9/2003 |
| JP | 2005-341646 A | 12/2005 |
| JP | 2006-279844 A | 10/2006 |
| JP | 2007-228695 A | 9/2007 |
| JP | 2007-252118 A | 9/2007 |
| JP | 2007-259600 A | 10/2007 |
| JP | 2007-330083 A | 12/2007 |
| JP | 2007-336778 A | 12/2007 |
| JP | 2008-054439 A | 3/2008 |
| JP | 2008-065635 | 3/2008 |
| JP | 2009-137456 A | 6/2009 |
| JP | 2009-183086 A | 8/2009 |
| JP | 2009-240150 A | 10/2009 |
| JP | 2009-254052 A | 10/2009 |
| JP | 2010-028913 A | 2/2010 |
| JP | 2010-512727 A | 4/2010 |
| KR | 20150022732 A | 3/2015 |
| WO | WO 2006/121761 A2 | 11/2006 |
| WO | WO 2007/037972 A2 | 4/2007 |
| WO | WO 2008/073453 A1 | 6/2008 |
| WO | WO 2008/073476 A2 | 6/2008 |
| WO | WO 2009/052446 A2 | 4/2009 |
| WO | WO 2011/102855 A1 | 8/2011 |
| WO | WO 2011/102856 A1 | 8/2011 |
| WO | 2018084152 A1 | 5/2018 |
| WO | WO 2020/198689 A1 | 10/2020 |

OTHER PUBLICATIONS

Guille et al., "A conceptual framework for the vehicle-to-grid (V2G) implementation," Energy Policy, vol. 37, Issue 11, Nov. 2009, pp. 4379-4390.

Kempton, William, "Electric Vehicles as a New Power Source for Electric Utilities," Transportation Research Part D: Transport and Environment, vol. 2, Issue 3, Sep. 1997, pp. 157-175.

Kempton et al., "Vehicle-to-Grid Power: Battery, Hybrid, and Fuel Cell Vehicles as Resources for Distributed Electric Power in California," Prepared for California Air Resources Board and the California Environmental Protection Agency (under contract #ARB00-612, "Feasability of Electric Drive Vehicles as Distributed Power Generation Assets in California"), and Los Angeles Department of Water and Power, Electric Transportation Program, in 94 pages.

Kempton et al., "Vehicle-to-grid power fundamentals: Calculating capacity and net revenue," Journal of Power Sources, vol. 144, Issue 1, Jun. 1, 2005, pp. 268-279.

Kempton et al., "Vehicle-to-grid power implementation: From stabilizing the grid to supporting large-scale renewable energy," Journal of Power Sources, vol. 144, Issue 1, Jun. 1, 2005, pp. 280-294.

SAE International, "SAE Electric Vehicle and Plug in Hybrid Electric Vehicle Conductive Charge Coupler," SAE Standard J1772TM Jan. 2010, Issued Oct. 1996, Revised Jan. 2010, in 51 pages.

Tomic et al., "Using fleets of electric-drive vehicles for grid support," Journal of Power Sources, vol. 168, Mar. 12, 2007, pp. 459-468.

(56) References Cited

OTHER PUBLICATIONS

International Search Report and Written Opinion for PCT Application No. PCT/US2020/025489, mailed Jun. 19, 2020, 15 pages.
Wei et al., "The effect of different charging strategies on EV load frequency control", 2016 International Conference on Smart Grid and Clean Energy Technologies, IEEE, Oct. 19, 2016, pp. 161-165.
Meng et al., "Dynamic frequency response from electric vehicles considering travelling behavior in the Great Britain power system", Applied Energy, Nov. 12, 2015, vol. 162, pp. 966-979.

\* cited by examiner

MULTI-TECHNOLOGY GRID REGULATION SERVICE

CROSS-REFERENCE TO RELATED CASES

This application claims the benefit of U.S. Provisional Patent Application No. 62/825,664, filed on Mar. 28, 2019, the entire contents of which are incorporated by reference herein.

INTRODUCTION

Aspects of the present disclosure relate to grid power management, and in particular, providing grid regulation services using multiple grid regulation service technologies.

Various advances in the art have made electric vehicles, including plug-in hybrid electric vehicles (collectively EVs), increasingly practical and desirable for private and commercial use. For example, advances in battery technologies have improved the energy capacity of EVs to the point that they are realistic options for private and commercial travel needs. Similarly, charging technologies have become faster and access to charging stations has become more widespread. These and other advances are driving wide-scale adoption of EVs, and the number of in-use EVs has significantly increased from even a few years ago.

Similarly, use of fixed energy storage (FES) systems (e.g., battery-based systems for residential or commercial use) is likewise on the rise. For example, residential and commercial customers are using FES systems to better control charges for electricity use—especially in time-of-use billing environments.

Because energy storage devices, such as EVs and FES systems, are regularly connected to the energy grid, they represent a significant opportunity for providing grid regulation services, such as frequency regulation, voltage regulation, peak shaving, reserve capacity, and others.

However, existing technologies for providing grid regulation services do not fully exploit the capabilities of the various energy storage devices that are regularly connected to the grid. For example, V1G technologies are generally configured for unidirectional power flow from the grid to an energy storage device, but not back to the grid. As such, a V1G resource, such as an energy storage device in an EV, may be controllably charged from the grid, but the same V1G resource cannot be controllably discharged to the grid. Consequently, the ability of a V1G resource to be used for grid services is more limited. Further, because there is a limit to the amount of power the V1G resource can absorb (e.g., until the battery is full) and a rate at which it can absorb energy (e.g., based on the connection between the resource and the grid, characteristics of the battery, characteristics of the battery charger, etc.), there is likewise a limit to the value of the grid regulation services that can be provided by the V1G resource. This is true of an individual V1G resource as well as an aggregated pool of V1G resources.

Owing to the limitations of V1G technologies, grid regulation service providers are rapidly moving towards V2G technologies, which enable bidirectional power flows between energy storage devices and the grid. Because V2G resources (e.g., energy storage devices in EVs or in FES systems) are capable of load-based and capacity-based services, they represent an appealing opportunity for grid regulation service providers. For example, an energy storage device in a V2G EV may be controllably charged or discharged to provide load or capacity-based grid regulation services. The additional capability to discharge power to the grid from a V2G resource expands the operating range of the V2G resource for grid regulation services (e.g., about a preferred operating point or level).

While both V1G and V2G technologies have proven useful, deployments of one technology is generally not compatible with the other. That is to say, a V1G system generally cannot leverage energy storage devices connected to a V2G system, and a V2G system generally cannot leverage energy storage devices connected to a V1G system. This is in-part because V1G equipment, such as electric vehicle supply equipment (EVSE) and electric vehicle equipment (EVE), may not be compatible with V2G resources, and V2G equipment may likewise not be compatible with V1G resources. For example, a V1G-enabled EV may not have the requisite hardware and/or software to provide V2G-type services even if attached to a V2G-capable EVSE.

The bifurcated nature of the technology deployments means that the capacities of all the grid-connected energy storage devices (e.g., EVs and FES installations) cannot be simultaneously leveraged. Further, as grid regulation service providers migrate to V2G-based systems, an ever larger base of otherwise functional V1G resources goes underutilized.

Accordingly, what is needed are systems and methods for leveraging grid resources of different type (e.g., V1G and V2G) simultaneously for performing grid regulation services.

BRIEF SUMMARY

A first aspect provides a method for providing a grid regulation service, including: determining a preferred operating point for use with one or more grid regulation resources of a first type, wherein the preferred operating point defines a preferred power delivery rate for the one or more grid regulation resources of the first type during a grid regulation service period; determining a predicted regulation up capacity and a predicted regulation down capacity of the one or more grid regulation resources of the first type for the grid regulation service period; commencing the grid regulation service period based on an indication; performing a grid regulation service during the grid regulation service period by varying a power delivery rate of the one or more grid regulation resources of the first type; and enabling one or more grid regulation resources of a second type to participate in the grid regulation service during the grid regulation service period based on: a rate of change of a grid characteristic exceeding a first threshold; and a difference between a first instant power delivery and one of the predicted regulation up capacity or the predicted regulation down capacity falling below a second threshold.

Another aspect provides a processing system, including: a memory comprising computer-executable instructions; one or more processors configured to execute the computer-executable instructions and cause the processing system to: determine a preferred operating point for use with one or more grid regulation resources of a first type, wherein the preferred operating point defines a preferred power delivery rate for the one or more grid regulation resources of the first type during a grid regulation service period; determine a predicted regulation up capacity and a predicted regulation down capacity of the one or more grid regulation resources of the first type for the grid regulation service period; commence the grid regulation service period based on an indication; perform a grid regulation service during the grid regulation service period by varying a power delivery rate of the one or more grid regulation resources of the first type;

and enable one or more grid regulation resources of a second type to participate in the grid regulation service during the grid regulation service period based on: a rate of change of a grid characteristic exceeding a first threshold; and a difference between a first instant power delivery and one of the predicted regulation up capacity or the predicted regulation down capacity falling below a second threshold.

Further aspects provide non-transitory computer readable media comprising instructions that, when executed by one or more processors of a processing system, cause the processing system to perform the aforementioned methods as well as those further described herein.

Further aspects provide a computer program product embodied on a computer readable storage medium comprising code for performing the aforementioned methods as well as those further described herein.

Further aspects provide a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
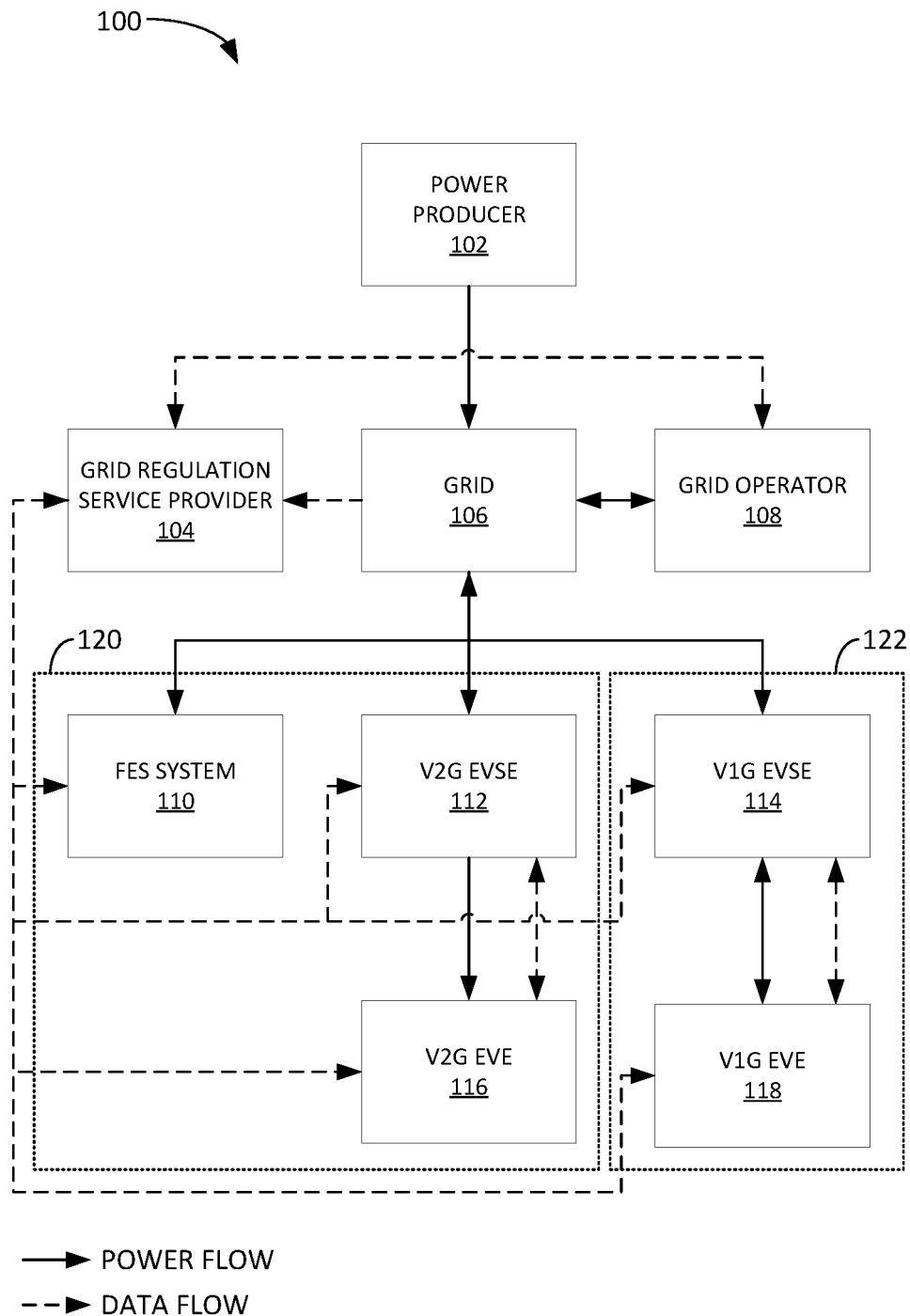
FIG. 1 depicts an example grid regulation service system.

Aspects of the present disclosure provide apparatuses, methods, processing systems, and computer readable mediums for performing grid regulation services by selectively enabling grid resources of a first type (e.g., V1G resources) during periods of grid regulation by grid resources of a second type (e.g., V2G resources).

Grid regulation services (also known as ancillary services), may include a broad spectrum of techniques for maintaining optimal operation of an electric grid. Grid regulation services may include, for example, scheduling and dispatch of electric power to a grid, reactive power and voltage control, loss compensation, load following, frequency control (e.g., frequency up and frequency down control), operating reserves, peak shaving, and others.

As briefly discussed above, V1G resources, including energy storage devices in EVs and unidirectional FES installations, provide unidirectional power flow capabilities for performing grid services. In order to provide a wider range of grid services despite the unidirectional power flow, a grid regulation service provider may define a preferred operating point or preferred operating level about which the unidirectional power flow may be varied, for example, to provide frequency regulation up or frequency regulation down. However, the preferred operating point constrains the total operating range of the V1G resource in order to enable regulation up and regulation down service.

V2G resources, including energy storage devices in EVs and bidirectional FES installations, provide bidirectional power flow capabilities that can be leveraged for a wider range of load and capacity-based grid regulation services because the energy storage devices may be controllably charged or discharged to provide the load or capacity to the grid. Like V1G resources, V2G resources, such as EVs, may also be charged according to a preferred operating point, but the operating range on either side of the preferred operating point is generally much larger than a V1G resource owing to the bidirectional power flow capability. Because V2G resources provide a wider range of capability for performing grid regulation services, they are becoming increasingly popular for grid regulation service providers (e.g., aggregators that perform such services).

Grid regulation service providers generally bid on grid regulation services based on characteristics of the grid-connected resources under their control, such as capacities of individual resources (e.g., energy storage device capacities), power flow capabilities (e.g., charge and discharge rate), expected times of availability, characteristics of the grid connection, and the like. However, when making bids for grid regulation services, the grid regulation service providers are constrained by uncertainty with respect to the availability and capacity of the resources in the aggregated pools. This is especially true when many of the resources in the aggregated pools are EVs controlled by third parties. Consequently, grid regulation service providers generally bid for grid regulation services at less than the full capacity of their aggregated pools of resources, which in-turn means that the grid regulation service providers do not realize the full economic value of their pools of aggregated resources.

Further, as grid regulation service providers move away from V1G deployments and towards V2G deployments, they may underutilize, or even stop utilizing altogether, the V1G resources in their pool of resources. This problem is particular acute for EVs because owners are keeping cars much longer now and thus may not replace their V1G EV with a V2G EV for many years. This again leaves significant regulation capability and thus economic value unrealized.

Described herein are methods to utilize V1G resources alongside V2G resources to enhance grid regulation services. For example, by selectively enabling V1G resources during times in which a V2G-based grid regulation service is nearing its operating capacity, a grid regulation service provider may enhance the operational range of its V2G-based grid regulation service without needing additional V2G resources. Instead, existing V1G resources may be leveraged to extend the capabilities of the V2G-based grid regulation service, which allows the grid regulation service provider to bid for a wider range of services and realize additional economic benefits. Further, it allows the grid regulation service provider the ability to continue to utilize older V1G resources alongside newer V2G system.

Notably, while V1G and V2G technologies are described as examples throughout, the systems and methods described herein are applicable to any unidirectional and bidirectional grid service systems, and may equally apply to future generations of EV and FES technologies as they emerge.

Example System for Providing Concurrent V1G and V2G-based Grid Regulations Services FIG. 1 depicts an example grid regulation service system 100 configured for providing concurrent V1G and V2G-based grid regulation services.

Power producer 102 may be one or more utility-level power producers, such as power plants, for providing grid power. Though shown as a single entity, power producer 102 may be representative of a plurality of power production entities, such as power plants of different type (e.g., coal, gas, nuclear, hydro, wind, solar, geothermal, and others). Power producer 102 provides power to grid 106.

Grid operator 108 is representative of one or more regional transmission organizations (RTOs), transmission system operators (TSOs), distribution system operators (DSOs), and/or independent system operator (ISOs) (e.g., a microgrid operator) that coordinate, control, and monitor grid 106.

Grid operator 108 may provide economic incentive for grid regulation service providers (e.g., 104) to provide grid regulation services for grid 106 beyond what can be provided by power producer 102 or by grid operator 108. For example, while power producer 102 may be able to change power production over time using a variety of different power production capabilities, power producer 102 may not be able to provide load-based services or other rapid regulation services for grid 106.

Grid operator 108 may also request status information from grid regulation service provider 104 as well as provide grid status information to grid regulation service provider 104.

Grid regulation service provider 104 may offer or "bid" to grid operator 108 to provide grid regulation services for grid 106 based on the grid resources under its control. For example, grid regulation service provider 104 may bid on a period of time in which it can provide electric load and/or capacity to grid 106 via controllable grid-connected resources, such as EVs and FES systems. As above, these grid-connected resources may be unidirectional, such as V1G-based resources, or bidirectional, such as V2G resources. If grid operator 108 accepts grid regulation service provider 104's bid, thereby forming a grid regulation service contract, it may subsequently send an electronic indication to grid regulation service provider 104 (e.g., via a data network connecting the two) to commence providing grid regulation services per the contract terms.

Grid regulation service provider 104 may then commence providing grid services by controlling energy flow to and from various resources within its control. In the example depicted in FIG. 1, grid regulation service provider 104 controls V2G system 120, which includes a plurality of (i.e., a pool of) V2G-enabled resources. In particular, V2G system 120 includes a bidirectional fixed energy storage (FES) system 110 (e.g., a fixed battery system) as well as an EV (not shown) including an energy storage device (not shown) and V2G electrical vehicle equipment (EVE) 116 connected to V2G electrical vehicle station equipment (EVSE) 112. Each of the V2G resources in V2G system 120 is capable providing controllable load or capacity to grid 106.

Note that while only one FES system, EVSE, and EVE is depicted as part of V2G system 120 for simplicity in this example, each of FES system 110, V2G EVSE 112, and V2G EVE 116 is meant to be representative of one or more devices of like kind. Further, the V2G resources depicted as part of V2G system 120 need not be collocated, and can in-fact be dispersed across significant distances. Aggregated V2G resource pools may include hundreds or thousands or even more connected resources, and the ability to provide grid services may be enhanced as the total number of the V2G resources increases.

Grid regulation service provider 104 further controls V1G system 122, which in this example includes an EV (not shown) including an energy storage device (not shown) and V1G EVE 118 connected to V1G EVSE 114. As with V2G system 120, while only one EVSE, and EVE is depicted as part of V1G system 122 for simplicity in this example, each of V1G EVSE 114, and V1G EVE 118 is meant to be representative of one or more devices of like kind. Further, in other examples, V1G system 122 may also include unidirectional FES systems.

Electrical vehicle equipment (EVE) (e.g., 116 and 118), generally refers to equipment located in an EV and configured to enable communication (e.g., with grid regulation service provider 104) and to control power flows from and/or to the EV's energy storage device (e.g., battery). In some implementations, EVE may be associated with attributes that characterize the EV in which the EVE is installed. For example, EV attributes may include: a unique grid-integrated vehicle ID, allowed billing and other commercial relationships, authorizations of this vehicle, such as IEEE 949 certification for anti-islanding, and technical capabilities of the vehicle, including maximum power output, whether it can produce power independently of grid power ("emergency power mode"), and others.

Electric vehicle station equipment (EVSE) (e.g., 112 and 114), generally refers to equipment for interfacing between EVE (e.g., 116 and 118) with a grid (e.g., 106). EVSE may provide communication capabilities as well as power control commands and/or capabilities to attached EVE. For example, EVSE may receive power control commands from grid regulation service provider 104. EVSE may generally be located at, for example, a building or parking garage, near a street, adjacent to a vehicle parking space, or anywhere else that an EV may be expected to connect to the grid to charge. EVSE may provide a connection means to EVE, such as a cable connector between the EVSE and an EV that includes the EVE.

Like EVE, EVSE may also be associated with attributes, such as status, location, characteristics of the EVSE's physical capabilities, legal and administrative allowances, legal and administrative restrictions, a unique EVSE ID, allowed billing and other commercial relationships, grid regulation services that may be authorized at a particular EVSE, and others.

FES system 110 is depicted as connected directly to grid 106; however, FES system 110 may have integral equipment similar in function to EVSE, which controls power flows to and from FES system 110 and which receives power control commands from grid regulation service provider 104. Owing to the fixed nature of FES system 110, the control equipment may be integral instead of separate as with the EVSE in this example (because the EVSE is meant to intermittently connect to more than one EV). In some implementations, FES system 110 may include a plurality of energy storage devices (e.g., batteries, battery packs, capacitors, and other types of energy storage) all electrically connected to an FES control system, which may function similarly to EVSE. In this way, collocated energy storage devices may be added modularly to an FES system without the need for redundant control equipment.

FIG. 1 depicts both V2G-capable EVSE and EVE (e.g., 112 and 116, respectively), which enable bidirectional power flows to and from grid 106, and V1G-capable EVSE and EVE (e.g., 114 and 118, respectively), which enable unidirectional power flow from grid 106. Thus, grid regulation service provider 104 may bid on grid regulation services based on the V2G and V1G resources under its control.

As depicted in FIG. 1, grid regulation service provider 104 may send control signals, commands, instructions, or other data messages to various aspects of V2G system 120 and V1G system 122 along the indicated data flow lines. For example, grid regulation service provider 104 may send control messages configured to control the flow of power to or from various V2G and V1G resources.

Grid regulation service provider 104 may likewise receive data back from various V2G and V1G resources along the indicated data flow lines. For example, grid regulation service provider 104 may receive status information regarding V2G and V1G resources that are currently connected, status information regarding the connected V2G and V1G resources (e.g., state of charge, total capacity, type of connection, environmental data such as temperature, charging and discharging capability, expected use or connection time, and the like). In some cases, grid regulation service provider 104 may communicate directly with, for example, an EV via the EV's EVE, while in other cases, grid regulation service provider 104 may communicate with an EV via EVSE connected to the EV. For example, an EV may have independent data communication capabilities (e.g., cellular) which can be leveraged as a communication path between the EV and grid regulation service provider 104.

In some examples, an EV may have independent and dependent data communication capabilities and may choose the data communication path based on factors such as context, quality of connection, cost, etc. For example, an EV may use its independent communication capability (e.g., via a cellular or other wireless network-based connection) while moving or connected to an EVSE without communication capabilities, and may use a dependent communication capability when connected to an EVSE with communication capabilities (e.g., via a wired connection to the EVSE or wireless-relay connection through the EVSE).

Notably, FIG. 1 depicts just one example of a system 100 for providing grid regulation services, such as concurrent V1G and V2G-based grid regulation services, and many others are possible. For example, different numbers of V1G and/or V2G resources, or other types of energy storage resources, may be provided and organized in different fashions. Further, different arrangements of data and power flows may be provided as compared to the example in FIG. 1. The methods described herein work with systems configured like system 100 as well as other configurations.

Example of Providing Multi-Technology Grid Regulation Services

Figure 2A:
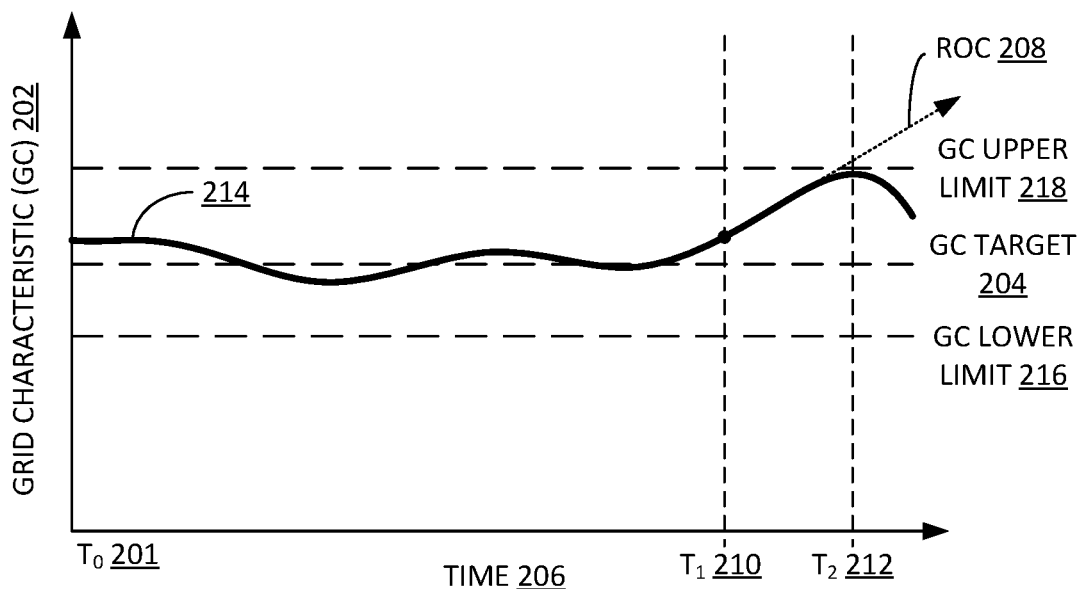
FIG. 2A depicts an example plot of a grid characteristic over time.
Figure 2B:
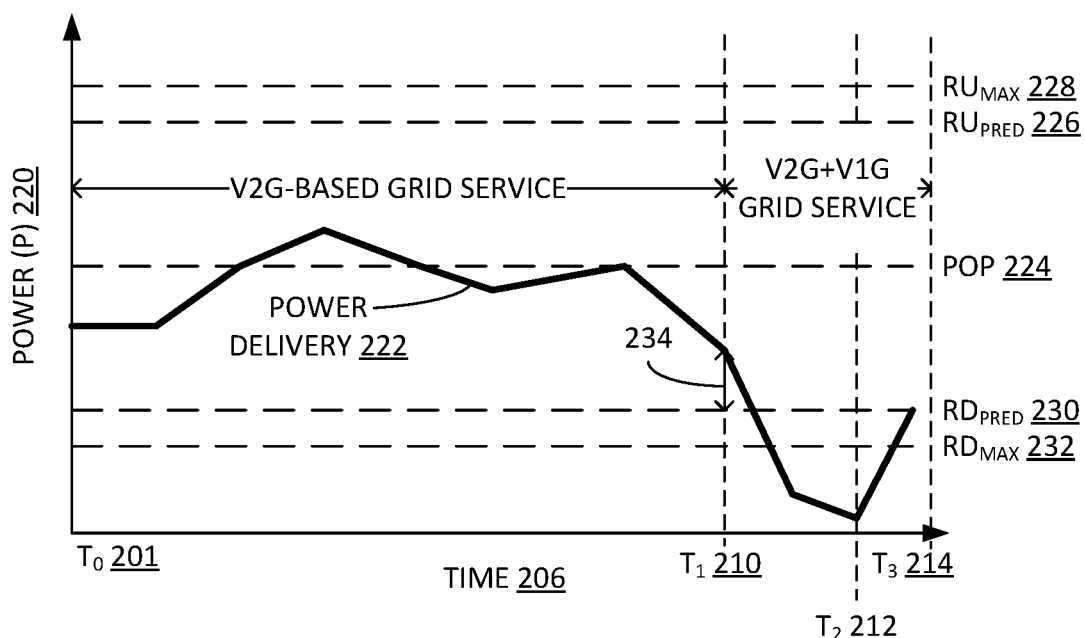
FIG. 2B depicts an example of providing grid regulation services using a grid regulation service system.

FIGS. 2A and 2B depict an example of providing a multi-technology grid regulation service.

FIG. 2A depicts an example plot of a grid characteristic 202 over time 206 in reference to a grid characteristic target 204, grid characteristic upper limit 218, and grid characteristic lower limit 216.

For example, grid characteristic 202 could be a grid frequency (e.g., measured in Hertz) over time. As another example, the grid characteristic 202 could be a grid voltage (e.g., measured in V or kV) over time. As yet another example, the grid characteristic 202 could be a grid load factor (e.g., measured in a percentage of total output capability) over time. As yet another example, grid characteristic 202 could be a grid load (e.g., measured in GW) over time. Note that these are just some examples of the grid characteristic 202 and others are possible.

Grid characteristic target 204, grid characteristic upper limit 216, and grid characteristic lower limit 216 may be set based on desired operational characteristics of the grid that is being monitored. For example, where grid characteristic 202 is a frequency of the grid, then grid characteristic target 204 may be a target frequency, such as 50 Hz or 60 Hz or the like, and grid characteristic upper limit 218 and grid characteristic lower limit 216 may be allowable deviations from grid characteristic target 204, such as +1 Hz and −1 Hz, respectively. Similarly, where grid characteristic 202 is a voltage of the grid, then target 204 may be a target voltage of the grid measured at a point of use, such as 230V at a residential or commercial meter, and grid characteristic upper limit 218 and grid characteristic lower limit 216 may be allowable deviations from the target voltage, such as +2.5V and −2.5V, respectively. Notably, these are just a few examples, and others are possible.

The measured value of the grid characteristic (indicated by line 214) may be monitored against upper and lower value limits, such as grid characteristic upper limit 218 and grid characteristic lower limit 216, as well as a rate of change of the value over a set interval. For example, at $T_1$ the rate of change (ROC) 208 may exceed a threshold value for allowable rate of change set by a grid operator (e.g., grid operator 108 in FIG. 1). In some implementations, rate of change 208 may be expressed as an absolute value so that it is always a positive number. In others, rate of change 208 may take on positive or negative values based on the direction of the change of power grid characteristic 214.

FIG. 2B depicts an example of providing grid regulation services using a grid regulation service system, such as described above with respect to FIG. 1. Note that FIGS. 2A and 2B are aligned in time.

In FIG. 2B, power 220 is represented on the vertical axis and time 206 is represented on the horizontal axis. Power delivery of the grid regulation service system (such as may be controlled by grid regulation service provider 104 in FIG. 1) is represented by power delivery line 222. Any point along power delivery line 222 may be referred to as an "instant" or "current" power delivery rate.

In some implementations, power delivery 222 may refer to a charging (or discharging) rate of grid regulation resources, such as energy storage devices in EVs or FES systems. In a V1G system, the power delivery is unidirectional, and so is always referring to a net charging rate for V1G system resources, such as energy storage devices in V1G EVs or unidirectional FES systems. In a V2G system, the power delivery is bidirectional, so the power delivery may refer to a net charging rate or a net discharging rate (negative charging rate) of the V2G resources, such as energy storage devices in V2G EVs or bidirectional FES systems.

FIG. 2B depicts several reference levels, including a preferred operating point 224 for power delivery 222 from the grid regulation service system. Preferred operating point 224 is set by the grid regulation service provider in order to service V2G resource demands (e.g., charging for EVs and FES system) as well as to provide grid regulation services. The preferred operating point 224 may be calculated by various methods.

Maximum regulation up capacity ($RU_{MAX}$) 228 indicates the maximum power that that the V2G system can provide for grid services relative to preferred operating point 224, and may also be referred to as a positive capacity limit. Maximum regulation up capacity 228 is based on the capacities of all the V2G system resources in the V2G system. Similarly, maximum regulation down capacity ($RD_{MAX}$) 232 indicates the minimum power (which may also represent the maximum load) that that the V2G system can provide relative to preferred operating point 224, and can also be referred to as a negative capacity limit.

As above, a grid regulation system comprising an aggregated pool of resources has inherent uncertainty with respect to the availability and state of each individual resource in the pool at any given time. For example, an EV may be plugged in later than expected, or may have more or less charge than expected when plugged in. As another example, an EV owner may go out of town and therefore their EV may sit unused and therefore need no or minimal charge during times when the EV is normally used and in need of charge. Many other sources of uncertainty exist.

Because of the uncertainty with respect to grid regulation resources (e.g., V1G and V2G resources), a grid regulation service provider may define further thresholds, such as a predicted regulation up capacity ($RU_{PRED}$) 226 that indicates the predicted maximum power that that the V2G system can provide relative to preferred operating point 224 during a grid regulation service period. The difference between the maximum regulation up capacity ($RU_{MAX}$) 228 and the predicted regulation up capacity ($RU_{PRED}$) 226 accounts for the uncertainty with respect to the underlying grid resources.

Similarly, predicted regulation down capacity ($RD_{PRED}$) 230 indicates the predicted minimum power (or predicted maximum load) that that the V2G system can provide during a grid regulation service period. Here again, the difference between the maximum regulation down capacity ($RD_{MAX}$) 232 and the predicted regulation down capacity ($RD_{PRED}$) 230 accounts for the uncertainty with respect to the underlying grid regulation service resources.

At any given point along power delivery line 222, differences between the actual power delivery and the various thresholds (e.g., $RU_{MAX}$ 228, $RU_{PRED}$ 226, $RD_{MAX}$ 232, and $RD_{PRED}$ 230) may be measured and monitored by the grid regulation service system in order to determine a likelihood or probability of exceeding the capacity of the grid regulation service system, which may result in enabling supplementary grid regulation resources as further discussed below.

By way of example, FIGS. 2A and 2B may reflect a grid regulation service, such as frequency regulation, provided by a grid regulation service system, such as described above with respect to FIG. 1. Thus, in this example, grid characteristic 202 reflects a grid frequency 214 that varies about a grid frequency target 204. As grid frequency 214 varies between time $T_0$ 201 and $T_1$ 210, the grid regulation service system varies power delivery 222 about preferred operating point 224 to provide both frequency regulation up and frequency regulation down in order to maintain grid frequency 214 at or near grid frequency target 204.

Notably, in this example, between time $T_0$ 201 and $T_1$ 210, the grid regulation service system is using only V2G resources to provide the grid regulation service. The use of exclusively V2G resources during this time interval may be based on a variety of factors, such as the ability to bid for a wider range of grid regulation services (as described above) based on the V2G resources, in addition to other factors, such as the technical performance of the V2G resources versus accessible V1G resources, the state of the V2G resources, economic considerations with respect to the V2G versus V1G resources, etc.

In one implementation, the various thresholds depicted in FIGS. 2A and 2B may be used to selectively activate a second or supplementary set of grid regulation resources. In some examples, the supplementary set of grid regulation resources may comprise grid regulation resources of a different type or technology, such as V1G resources versus V2G resources in this example.

In some implementations, activations of the supplementary set of grid regulation resources may be based on rules or conditions defined with respect to the various depicted thresholds. For example, the supplementary set of V1G resources are enabled at time $T_1$ 210 based on two concurrent conditions, which may form the basis of a single rule. First, in this example, the rate of change 208 of grid frequency 224 (or another grid characteristic in a different example) exceeds a first threshold. Second, in this example, a difference 234 between the power delivery level 222 and predicted regulation down capacity 230 has gone below a second threshold. These conditions taken together indicate that the grid frequency 214 may quickly reach a level exceeding the grid regulation capabilities of the grid regulation service system. And if grid frequency 214 is not regulated, for example, within the terms of a contract with a grid operator (e.g., 108 in FIG. 1), the grid regulation service provider may forfeit the economic benefit of the grid regulation service contract. For example, if grid frequency 214 breaches the grid frequency upper limit 218 in this example, the grid regulation service provider may lose compensation for the contracted grid regulation services.

In this example, between time $T_1$ 210 and $T_3$ 214, supplementary grid regulation resources, for example in a V1G system like 122 in FIG. 1, are enabled to provide additional grid regulation service capacity. During this time interval, power deliver 222 goes below the predicted regulation down capacity 230 and the maximum regulation down capacity 232 (also referred to as the negative capacity limit) of the V2G grid regulation service system. However, enabling the supplementary V1G resources to participate in the grid regulation service provides additional grid regulation capacity and prevents grid frequency 214 from exceeding grid frequency upper limit 218.

In this example, the grid regulation service system disables the supplementary V1G resources and returns to V2G-based grid regulation service once power delivery 222 moves above the predicted regulation down capacity 230. Notably, this is after the rate of change 208 of grid frequency 214 has already dropped back below the first threshold. However, even though that first condition is no longer true, the power delivery 222 during the time interval between $T_2$ 212 and $T_3$ 214 remains below the predicted regulation down capacity 230 of the V2G resources alone. Thus, the conditions necessary to enable the supplementary set of grid regulation resources may be different than the conditions necessary to disable them.

Table 1, below, shows examples of various conditions that may cause supplementary grid regulation resources to be enabled by a grid regulation service system. Notably, in some cases, multiple conditions must be met, such as those based on rates of change (ROC) and differences between power delivery (PD) 222 and predicted regulation down capacity ($RD_{PRED}$) 230 falling below a threshold ($TH_2$), or predicted regulation up capacity ($RU_{PRED}$) 226 falling below a threshold ($TH_3$). In other cases, only a single condition need be met, such as when the grid characteristic (GC) 214 exceeds a grid characteristic upper limit ($GC_{UL}$) 218 or falls below a grid characteristic lower limit ($GC_{LL}$) 216, or comes within some threshold distance to the upper and lower grid characteristic limits.

TABLE 1

Example Supplementary Resource Enable Logic

| Enable Supp. Resources | ROC > $TH_1$ | PD − $RD_{PRED}$ < $TH_2$ | $RU_{PRED}$ − PD < $TH_3$ | GC > $GC_{UL}$ | GC < $GC_{LL}$ |
|---|---|---|---|---|---|
| Y | Y | Y | N | — | — |
| Y | Y | N | Y | — | — |
| Y | — | — | — | Y | N |
| Y | — | — | — | N | Y |

Further, in some implementations, supplementary resources may be enabled when a time (T) that the power delivery (PD) 222 has been a certain threshold above or below preferred operating point 224 exceeds a threshold.

Notably, Table 1 is just one example, and other combinations as well as other conditions may be considered for enabling supplementary grid regulation resources.

Table 2, below, shows examples of various conditions that may cause supplementary grid regulation resources to be disabled.

TABLE 2

Example Supplementary Resource Disable Logic

| Disable Supp. Resources | ROC > $TH_1$ | PD > $RD_{PRED}$ | PD < $RU_{PRED}$ | GC < $GC_{UL}$ | GC > $GC_{LL}$ | T > TH |
|---|---|---|---|---|---|---|
| Y | N | Y | Y | Y | Y | N |
| Y | — | — | — | — | — | Y |

For example, supplementary grid regulation resources may be disabled when power delivery (PD) 222 is above the predicted regulation down capacity ($RD_{PRED}$) 230 and below the predicted regulation up capacity ($RU_{PRED}$) 226 and when a grid characteristic (GC) 214 is above a grid characteristic lower limit ($GC_{LL}$) 216 and below a grid characteristic upper limit ($GC_{UL}$) 218. In some implementations, a time (T) that the supplementary grid regulation resources have been enabled may be compared to a threshold (TH) and the supplementary grid regulation resources may be disabled upon T exceeding TH.

As with Table 1, Table 2 is just one example, and other combinations as well as other conditions may be considered for disabling supplementary grid regulation resources.

Example Method for Providing Multi-Technology Grid Regulation Service

Figure 3:
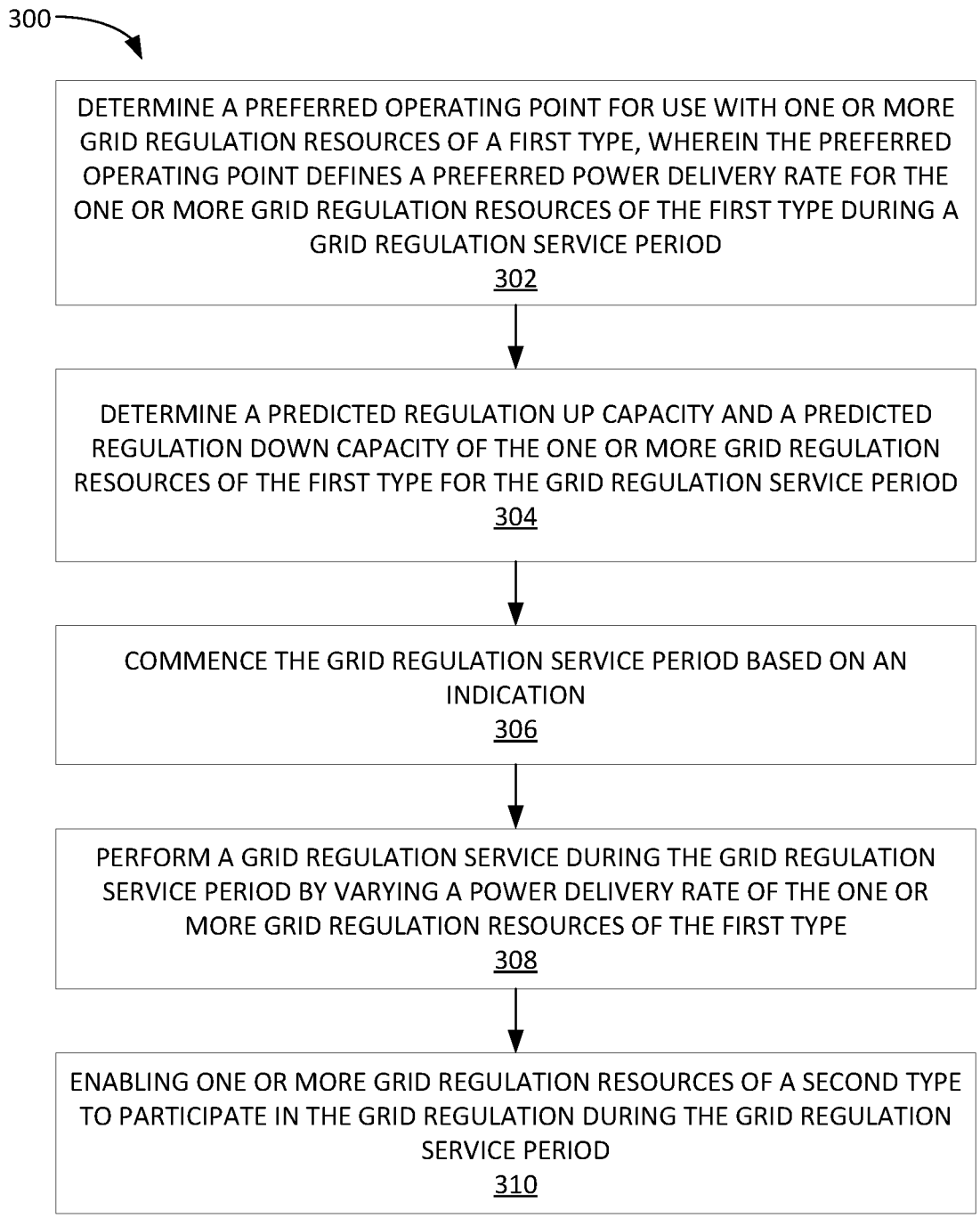
FIG. 3 depicts an example method for providing grid regulation service.

FIG. 3 depicts an example method 300 for providing grid regulation service based on multiple grid regulation service technologies.

Method 300 begins at step 302 with determining a preferred operating point for use with one or more grid regulation resources of a first type, wherein the preferred operating point defines a preferred power delivery rate for the one or more grid regulation resources of the first type during a grid regulation service period.

Method 300 then proceeds to step 304 with determining a predicted regulation up capacity and a predicted regulation down capacity of the one or more grid regulation resources of the first type for the grid regulation service period.

In some implementations, the predicted regulation up capacity and the predicted regulation down capacity of the one or more grid regulation resources of the first type is based on one or more of: a number of grid regulation resources of the first type predicted to be available during the grid regulation service period; a power capacity of each grid regulation resources of the first type; and a power rating of each electric vehicle supply equipment connected to each grid regulation resources of the first type.

Method 300 then proceeds to step 306 with commencing the grid regulation service period based on an indication.

In some implementations, the indication comprises an instruction to commence the grid regulation service period received from one of: an independent system operator (ISO), a regional transmission organization (RTO), a transmission system operator (TSO), a distribution system operator (DSO), or a microgrid operator.

Method 300 then proceeds to step 308 with performing a grid regulation service during the grid regulation service period by varying a power delivery rate of the one or more grid regulation resources of the first type.

Method 300 then proceeds to step 310 with enabling one or more grid regulation resources of a second type to participate in the grid regulation service during the grid regulation service period. In one implementation, enabling the one or more grid regulation resources of the second type is based on a rate of change of a grid characteristic exceeding a first threshold; and a difference between a first instant power delivery and one of the predicted regulation up capacity or the predicted regulation down capacity falling below a second threshold.

In one implementation, the one or more grid regulation resources of the first type comprise V2G grid resources and the one or more grid regulation resources of the second type comprise V1G grid resources.

In another implementation, the one or more grid regulation resources of the first type comprise fixed energy storage grid resources, and the one or more grid regulation resources of the second type comprise V1G grid resources. In some implementations, the fixed energy storage grid resources are bidirectional fixed battery installations.

In yet another implementation, the one or more grid regulation resources of the first type comprise V2G grid resources, and the one or more grid regulation resources of the second type comprise fixed energy storage grid resources. In some implementations, the fixed energy storage grid resources are bidirectional fixed battery installations.

In some implementations, the V2G grid resources comprise V2G-enabled EVs. In some implementations the V2G grid resources may further or alternatively comprise bidirectional FES systems.

In some implementations the V1G grid resources comprise V1G-enabled EVs. In some implementations, the V1G grid resources may further or alternatively comprise unidirectional FES systems.

In some implementations, the grid characteristic is one of a grid frequency, a grid voltage, a grid load factor, or a grid load.

In some implementations, method 300 further includes monitoring the grid characteristic and generating the indication when the grid characteristic exceeds a grid characteristic upper limit, or falls below a grid characteristic lower limit.

In some implementations, method 300 further includes transmitting a command to the one or more grid regulation resources of the second type through one or more electric vehicle supply equipments (or apparatuses) connected to the one or more grid regulation resources of the second type.

In some implementations, method 300 further includes disabling the one or more grid regulation resources of the second type from participating in the grid regulation service. For example, disabling the one or more grid regulation resources of the second type may be based on the rate of change of a grid characteristic falling below the first threshold and the difference between a second instant power delivery and one of the predicted regulation up capacity or the predicted regulation down capacity exceeding the second threshold.

In some implementations, method 300 further includes predicting the number of grid regulation resources of the first type to be available during the grid regulation service period based on historical data received from a plurality of electric vehicle supply equipments associated with the grid regulation resources of the first type.

In some implementations, method 300 further includes predicting the number of grid regulation resources of the first type to be available during the grid regulation service period based on user schedule data. In some implementations, the user schedule data may be received from a plurality of electric vehicle supply equipments associated with the grid regulation resources of the first type. In other implementations, the user schedule data may be received from one or more EVEs associated with one or more EVs. In yet other implementations, the user schedule data may be received directly from a user via, for example, a web-based application or a mobile application.

In one implementation, the grid regulation service is a peak shaving service. In such an implementation, the grid characteristic may be a grid load factor and method 300 may further include causing power to flow from the grid regulation resources of the first type to the grid regulation resources of the second type in order to reduce the grid load factor while providing the grid regulation service.

Example Application for Multi-Technology Grid Regulation System

A grid regulation service provider, such as 104 in FIG. 1, may leverage its control over grid regulation resources of different types to provide multi-technology grid regulation services.

For example, if the grid regulation service provider undertakes a peak shaving grid service, it may use bidirectional flow grid resources, such as resources in V2G system 120 in FIG. 1, to provide power to unidirectional flow grid resources, such as resources in V1G system 122 in FIG. 1. In this way, the grid regulation system avoids putting additional demand on the grid during the peak shaving grid service period while still maintaining the capacity to deliver power to certain resources, such as V1G EVs.

While performing a grid regulation service by utilizing grid resource systems of different type (e.g., a V2G and a V1G-type resource system), thresholds for the grid resource systems may be monitored as described above (e.g., with respect to preferred operating points and predicted regulation up and regulation down capacities).

Example Data Flow for Multi-Technology Grid Regulation Service

Figure 4:
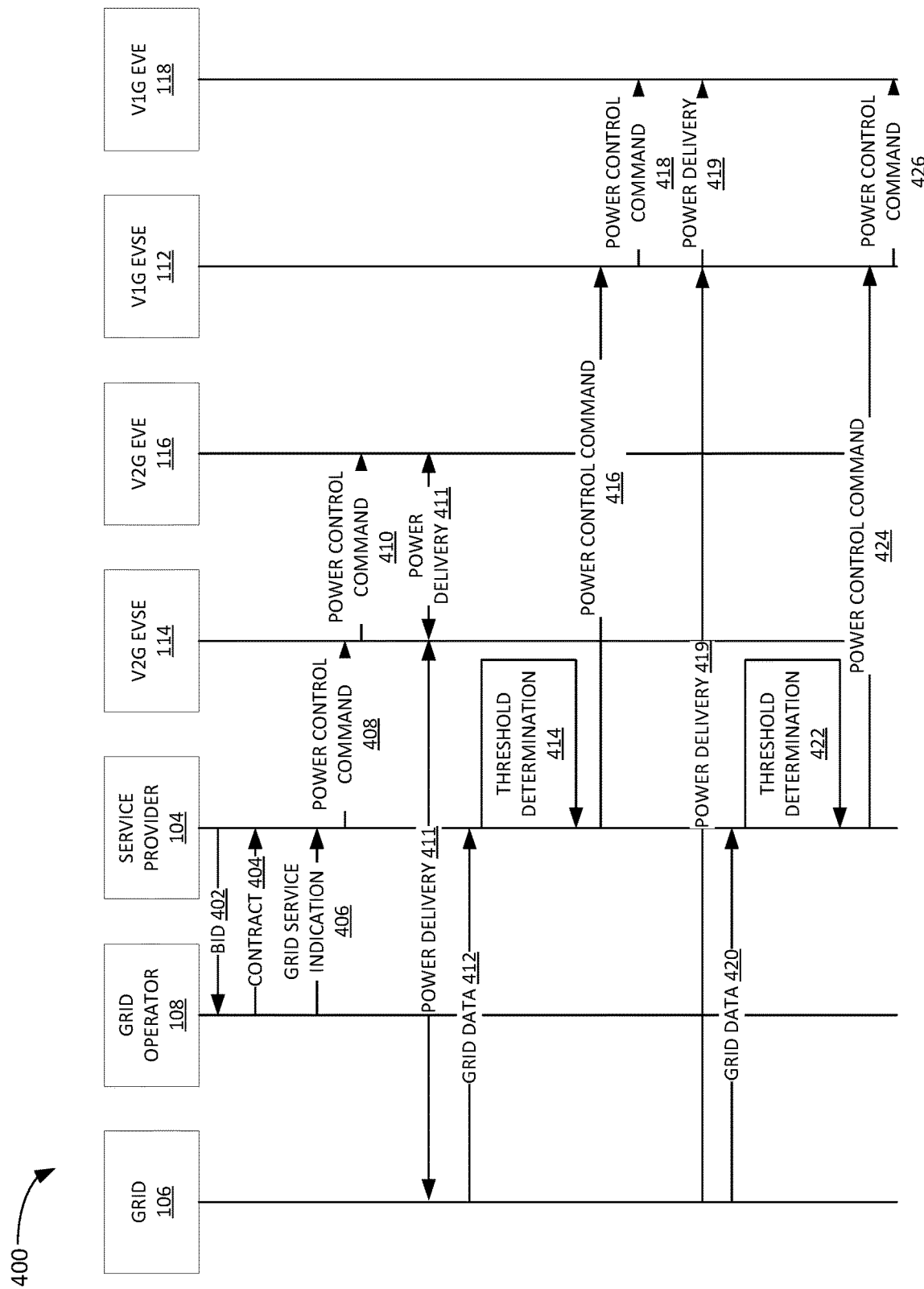
FIG. 4 depicts an example data flow for multi-technology grid regulation service.

FIG. 4 depicts an example data flow 400 for multi-technology grid regulation service. In particular, FIG. 4 depicts an example of providing grid regulation services using V2G and V1G EVs.

Flow 400 begins at 402 where a grid regulation service provider 104 bids on a grid regulation service requested by grid operator 108. In response, grid operator 108 may accept the bid and provide a contract 404 for grid regulation service. The grid regulation service contract 404 may include, for example, a defined grid regulation service period and other characteristics for the grid regulation service, such as the various thresholds discussed above with respect to FIGS. 2A and 2B.

During the contracted grid service period, grid operator 108 may detect a need for a grid service (e.g., a regulation up or regulation down service or any other service as described herein) and transmit a grid service indication 406 to grid regulation service provider 104 to perform grid regulation services consistent with contract 404.

Upon receiving grid service indication 406, grid regulation service provider 104 may issue a power control command 408 to a grid regulation resource, such as in this example a V2G EVSE 114. In implementations where an EV controls the flow of power into and out of its energy storage device (e.g., battery) V2G EVSE 114 may then transmit (or relay) a power control command 410 to V2G EVE 116. In other implementations, V2G EVSE 114 may directly control the power flow from the EV's energy storage device. Power control command 410 may include additional data, such as EVSE attributes that are useable by EVE 116 to determine power flow characteristics.

V2G EVE 116 then provides grid regulation capacity by regulating its power use (e.g., by absorbing or providing power to grid 106) via power delivery 411 (which in this example is shown through V2G EVSE 114).

While providing the grid regulation service, grid regulation service provider 104 may receive grid data 412. In this example, grid data 412 comes from grid 106, but in other examples grid data 412 could come from grid operator 108 or other sources. Grid regulation service provider 104 uses grid data 412 to check thresholds, as discussed above with respect to FIGS. 2A and 2B, in order to determine a need to enable additional grid resources.

In this example, grid regulation service provider 104 makes a determination 414 that additional grid resources are needed to provide the contracted grid regulation service. Accordingly, grid regulation service provider 104 sends a power control command 416 to a grid resource of a second type. In this example, the grid resource of the second type is V1G EVSE 112. V1G EVSE 112 may then transmit (or relay) a power control command 418 to V1G EVE 118. Power control command 418 may include additional data, such as EVSE attributes that are useable by V1G EVE 118 to determine power flow characteristics.

V1G EVE 118 then provides grid regulation capacity by regulating its power use (e.g., by absorbing power from grid 106 at a controlled rate) via power delivery 419 (which in this example is shown through V1G EVSE 112).

While providing the grid regulation service via both V2G and V1G resources, grid regulation service provider 104 may receive additional grid data 420, which is used to again check thresholds, as discussed above with respect to FIGS. 2A and 2B. This time, grid service provider 104 determines that the V1G resource in no longer needed to perform the contracted grid service. Accordingly, grid service provider 104 sends power control command 424 to V1G EVSE 112 to disable the grid service. V1G EVSE 112 then transmits power control command 426 to V1G EVE 118 to discontinue providing the grid service.

Notably, FIG. 4 depicts just one example of a message flow between aspects of a grid regulation service system, and many other flows are possible.

Example Grid Regulation Service System Equipment

Figure 5A:
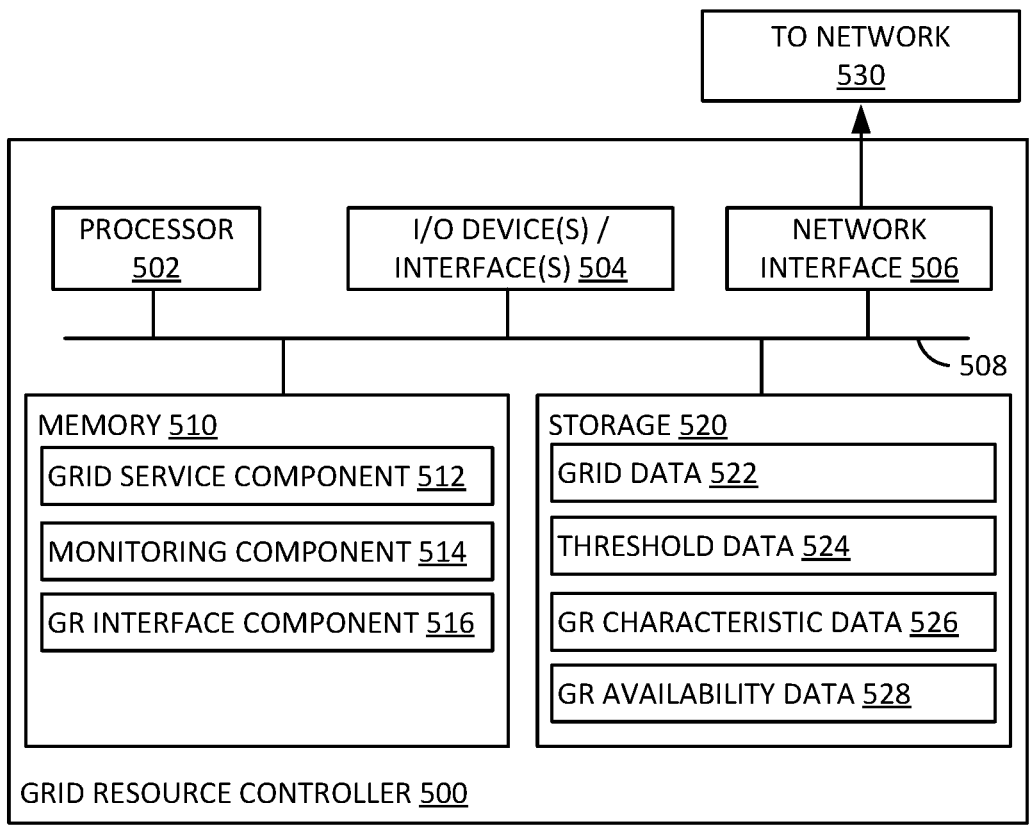
FIG. 5A depicts an example of a grid resource controller.
Figure 5B:
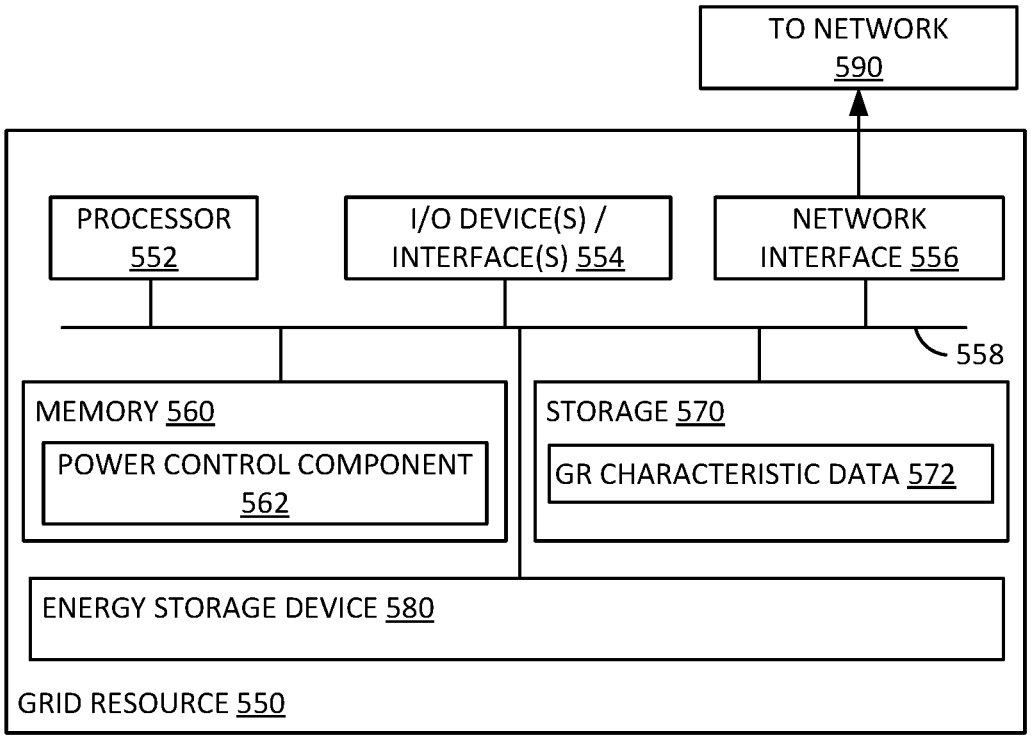
FIG. 5B depicts aspects of an example grid resource.

FIGS. 5A and 5B depict example grid regulation service system equipment.

In particular, FIG. 5A depicts an example of a grid resource controller 500. Grid resource controller 500 could be used, for example, by a grid resource service provider to control grid resources within a grid regulation service system, such as system 100 described above with respect to FIG. 1, for providing grid regulation services, as described, for example, above with respect to FIGS. 2A, 2B, 3, and 4.

Grid resource controller 500 includes a processor 502 configured to access data in memory 510 as well as data in storage 520 via, for example, bus 508. While shown as a single memory 510 and storage 520 for simplicity in this example, memory 510 may be representative of multiple memories accessible to grid resource controller 500, and likewise storage 520 may be representative of multiple storages accessible to grid resource controller 500. Moreover, while specific components are depicted within memory 510 and storage 520 in this example, in other examples aspects in storage 520 may instead be in memory 510, or vice versa.

Processor 502 is further configured to exchange data with I/O devices and related interfaces 504 as well as with network 530 via network interface 506. Network 530 is representative of any sort of data communication network, including wired and wireless networks, such as local area networks (LANs), wide area networks (WANs), the internet, private networks, and the like.

Processor 502 is further configured to execute computer-executable instructions for performing functions associated with grid service component 512, monitoring component 514, and grid resource interface component 516 in this example. For example, processor 502 is configured to execute non-transitory computer-executable instructions associated with grid service component 512 to perform functions such as described above with respect to FIGS. 2A, 2B, 3, and 4.

For example, processor 502 may execute grid service component 512 in order to: determine preferred operating points for use with grid regulation resources; determine, store, and recall various threshold data 524; determine predicted regulation up capacities and regulation down capacities, for example, based on grid resource characteristic data 526, grid resource availability data 528, and threshold data 524; receive or generate indications to commence providing grid regulation services, for example, via network interface 506 and network 530; perform and control grid regulation services, in some implementations, via grid resource interface component 516, by commanding power flows rates to and from grid resources; receive, store, and analyze grid data 522, for example, via monitoring component 514; enable or disable grid regulation resources based on determined rules and/or conditions, in some implementations, via control messages transmitted and status message received via grid resource interface component 516; predict grid resource availability, for example, based on historical grid resource availability data 528 and/or user provided (e.g., scheduled) grid resource availability data 528; and generally to perform the grid regulation services described and claimed herein.

While processor 502 is depicted as a single processor in this example, processor 502 is meant to be representative of one or more processors, including in some examples different types of processors working together (e.g., a central processing unit (CPU) and a graphical processing unit GPU or other type of processor). Further, in some examples, grid resource controller 500 may be implemented across multiple devices, such as in a cloud-computing implementation, where various physical resources, such as processors, memories, and storage are virtualized.

Grid resource controller 500 may perform grid regulation service by interfacing with, receiving data from, and sending commands to grid resources, such as grid resource 550 in FIG. 5B. For example, grid resource controller 500 may interface with various types of grid resources via grid resource interface component 516, which may define specific communication and command protocols. In some examples, grid resource interface component 516 may be configured for interfacing with an intermediary device, such as an EVSE (described above). In other cases, grid resource controller 500 may interface directly with grid resource 550 through an external API or other interface, not depicted in FIG. 5A or 5B.

Notably, the arrangement of components depicted in FIG. 5A is just one example, and many other are possible consistent with this disclosure. For example, the functions described herein may be configured to be performed by fewer or more components based on additional types of data, as described herein.

FIG. 5B depicts aspects of an example grid resource, such as a V1G resource, V2G resource, or FES resource, as described above with respect to FIG. 1, or other resource types described herein. Grid resource 550 may be configured to perform grid regulation services, such as described above with respect to FIGS. 2A, 2B, 3, and 4, within a grid regulation service system, such as system 100 described above with respect to FIG. 1.

Grid resource 550 includes a processor 552 configured to access data in memory 560 as well as data in storage 570 via, for example, bus 558. While shown as a single memory 560 and storage 570 for simplicity in this example, memory 560 may be representative of multiple memories accessible to grid resource 550, and likewise storage 570 may be representative of multiple storages accessible to grid resource 550. Moreover, while specific components are depicted within memory 560 and storage 570 in this example, in other examples aspects in storage 570 may instead be in memory 560, or vice versa.

Processor 552 is further configured to exchange date with I/O devices and related interfaces 554 as well as with network 590 via network interface 556. Network 590 is representative of any sort of data communication network, including wired and wireless networks, such as local area networks (LANs), wide area networks (WANs), the internet, private networks, and the like. In some case, network 590 is the same as network 530 in FIG. 5A, such as the Internet, while in other cases network 590 may be otherwise connected to network 530 in FIG. 5A.

Processor 552 is further configured to execute computer-executable instructions for performing functions associated with power control component 562. For example, processor 552 may execute power control component 562 in order to control the rate of power delivery to and/or from energy storage device 580 as described above with respect to FIGS. 2A, 2B, 3, and 4. Processor 552 may further access grid resource characteristic data and provide the same to, for example, grid resource controller 500.

Energy storage device 580 is depicted as a single device, but is intended to be representative of one or more devices. Energy storage device 580 may be, for example, one or more batteries, a battery pack, one or more capacitors, a kinetic energy storage device configured to exchange kinetic energy for electrical energy, a heat energy storage device configured to exchange heat energy for electrical energy, a chemical energy storage device configured to exchange chemical energy for electrical energy, or any other electrical energy storage device or combination of the aforementioned energy storage devices.

In some cases, power control component 562 may be wholly implemented within a grid resource, such as an EV or FES system, and in other cases power control component 562 may interface with or otherwise be implemented in an external device, such as an EVSE that interfaces with EVE of an EV.

Notably, the arrangement of components depicted in FIG. 5B is just one example, and many other are possible consistent with this disclosure. For example, the functions described herein may be configured to be performed by fewer or more components based on additional types of data, as described herein.

EXAMPLE ASPECTS

Example 1

A method for providing a grid regulation service, comprising: determining a preferred operating point for use with one or more grid regulation resources of a first type, wherein the preferred operating point defines a preferred power delivery rate for the one or more grid regulation resources of the first type during a grid regulation service period; determining a predicted regulation up capacity and a predicted regulation down capacity of the one or more grid regulation resources of the first type for the grid regulation service period; commencing the grid regulation service period based on an indication; performing a grid regulation service during the grid regulation service period by varying a power delivery rate of the one or more grid regulation resources of the first type; and enabling one or more grid regulation resources of a second type to participate in the grid regulation service during the grid regulation service period based on: a rate of change of a grid characteristic exceeding a first threshold; and a difference between a first instant power delivery and one of the predicted regulation up capacity or the predicted regulation down capacity falling below a second threshold.

Example 2

The method of Example 1, wherein: the one or more grid regulation resources of the first type comprise V2G grid resources, and the one or more grid regulation resources of the second type comprise V1G grid resources.

Example 3

The method of Example 1 wherein: the one or more grid regulation resources of the first type comprise fixed energy storage grid resources, and the one or more grid regulation resources of the second type comprise V1G grid resources.

Example 4

The method of Example 1, wherein: the one or more grid regulation resources of the first type comprise V2G grid resources, and the one or more grid regulation resources of the second type comprise fixed energy storage grid resources.

Example 5

The method of any one of Examples 1-4, wherein the grid characteristic is a grid frequency.

Example 6

The method of any one of Examples 1-5, wherein the indication comprises an instruction to commence the grid regulation service period received from one of: an independent system operator (ISO), a regional transmission organization (RTO), a transmission system operator (TSO), a distribution system operator (DSO), or a microgrid operator.

Example 7

The method of any one of Examples 1-6, further comprising: monitoring the grid characteristic; and generating the indication when the grid characteristic: exceeds a grid characteristic upper limit, or falls below a grid characteristic lower limit.

Example 8

The method of any one of Examples 1-7, further comprising: transmitting a command to the one or more grid regulation resources of the second type through one or more electric vehicle supply equipments connected to the one or more grid regulation resources of the second type.

Example 9

The method of any one of Examples 1-8, further comprising: disabling the one or more grid regulation resources of the second type from participating in the grid regulation service based on: the rate of change of a grid characteristic falling below the first threshold; and the difference between a second instant power delivery and one of the predicted regulation up capacity or the predicted regulation down capacity exceeding the second threshold.

Example 10

The method of any one of Example 1-9, wherein the predicted regulation up capacity and the predicted regulation down capacity of the one or more grid regulation resources of the first type is based on: a number of grid regulation resources of the first type predicted to be available during the grid regulation service period; a power capacity of each grid regulation resources of the first type; and a power rating of each electric vehicle supply equipment connected to each grid regulation resources of the first type.

Example 11

The method of any one of Examples 1-10, further comprising: predicting the number of grid regulation resources of the first type to be available during the grid regulation service period based on historical data received from a plurality of electric vehicle supply equipments associated with the grid regulation resources of the first type.

Example 12

The method of any one of Examples 1-11, further comprising: predicting the number of grid regulation resources of the first type to be available during the grid regulation service period based on user schedule data received from a plurality of electric vehicle supply equipments associated with the grid regulation resources of the first type.

Example 13

The method of any one of Examples 1-4 or 6-12, wherein: the grid regulation service is a peak shaving service, the grid characteristic is a grid load factor, and the method further comprises: causing power to flow from the grid regulation resources of the first type to the grid regulation resources of the second type in order to reduce the grid load factor.

Example 14

A non-transitory computer readable media comprising instructions that, when executed by one or more processors of a processing system, cause the processing system to perform the method of any one of Examples 1-13.

Example 15

A computer program product embodied on a computer readable storage medium comprising code for performing the method of any one of Examples 1-13.

Example 16

A processing system comprising a memory with computer-executable instructions and one or more processors configured to execute the computer-executable instructions and cause the processing system to perform the method of any one of Examples 1-13.

Example 17

A processing system comprising means for the method of any one of Examples 1-13.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for providing a grid regulation service, comprising:

determining a preferred operating point for power delivery from a grid regulation service system, the preferred operating point for use with a V2G system comprising a first plurality of grid regulation resources, each of the first plurality of grid regulation resources comprising a bidirectional resource, and wherein the preferred operating point defines a preferred power delivery rate for each of the first plurality of grid regulation resources during a grid regulation service period, the bidirectional resource configured to enable bidirectional power flow;

determining a predicted regulation up capacity and a predicted regulation down capacity of the V2G system for the grid regulation service period;

commencing the grid regulation service period based on an indication;

performing the grid regulation service during the grid regulation service period by varying a power delivery rate for at least one of the first plurality of grid regulation resources;

while continuing performing the grid regulation service using the V2G system, enabling, via a supplementary grid regulation step, at least one of a second plurality of grid regulation resources as a supplement to the V2G system to participate in the grid regulation service during the grid regulation service period, each of the second plurality of grid regulation resources comprising a V1G grid resource configured for unidirectional power flow from a grid to an energy storage device, wherein the supplementary grid regulation step is based on:

a grid characteristic exceeding a first threshold; and a difference between a first instant power delivery and one of the predicted regulation up capacity or the predicted regulation down capacity falling below a second threshold; and disabling the at least one of the second plurality of grid regulation resources from participating in the grid regulation service based on:

the grid characteristic falling below the first threshold; and the difference between a second instant power delivery and one of the predicted regulation up capacity or the predicted regulation down capacity exceeding the second threshold.

2. The method of claim 1, wherein the indication comprises an instruction to commence the grid regulation service period received from one of: an independent system operator (ISO), a regional transmission organization (RTO), a transmission system operator (TSO), a distribution system operator (DSO), or a microgrid operator.

3. The method of claim 1, further comprising:
monitoring a grid frequency; and
generating the indication when the grid frequency:
exceeds a grid frequency upper limit, or
falls below a grid frequency lower limit.

4. The method of claim 3, wherein the grid characteristic is a rate of change of the grid frequency.

5. The method of claim 1, further comprising: transmitting a command to one of the second plurality of grid regulation resources through a respective electric vehicle supply equipment connected to the one of the second plurality of grid regulation resources.

6. The method of claim 1, wherein the predicted regulation up capacity and the predicted regulation down capacity of the V2G system is based on:
a number of the first plurality of grid regulation resources predicted to be available during the grid regulation service period;
a power capacity of each of the first plurality of grid regulation resources; and
a power rating of each of a plurality of electric vehicle supply equipments, each of the plurality of electric vehicle supply equipments connected to, and associated with, a respective grid regulation resource from the first plurality of grid regulation resources.

7. The method of claim 6, further comprising: predicting the number of the first plurality of grid regulation resources to be available during the grid regulation service period based on historical data received from the plurality of electric vehicle supply equipments.

8. The method of claim 6, further comprising: predicting the number of the first plurality of grid regulation resources to be available during the grid regulation service period based on user schedule data received from the plurality of electric vehicle supply equipments.

9. The method of claim 1, wherein:
the grid regulation service is a peak shaving service,
the grid characteristic is a grid load factor, and
the method further comprises: causing power to flow from at least one of the first plurality of grid regulation resources to at least one of the second plurality of grid regulation resources in order to reduce the grid load factor.

10. A processing system, comprising:
a memory comprising computer-executable instructions;
one or more processors configured to execute the computer-executable instructions and cause the processing system to:
determine a preferred operating point for power delivery from a grid regulation service system, the preferred operating point for use with a V2G system comprising a first plurality of grid regulation resources, each of the first plurality of grid regulation resources comprising a bidirectional resource, wherein the preferred operating point defines a preferred power delivery rate for each of the first plurality of grid regulation resources during a grid regulation service period;
determine a predicted regulation up capacity and a predicted regulation down capacity of the V2G system for the grid regulation service period;
commence the grid regulation service period based on an indication;
perform a grid regulation service during the grid regulation service period by varying a power delivery rate for at least one of the first plurality of grid regulation resources; and
while continuing performing the grid regulation service using the V2G system, enable, via a supplementary grid regulation step, at least one of a second plurality of grid regulation resources as a supplement to the V2G system to participate in the grid regulation service during the grid regulation service period, each of the second plurality of grid regulation resources comprising a V1G grid resource configured for unidirectional power flow from a grid to a respective energy storage device, wherein the supplementary grid regulation step is based on:
a grid characteristic exceeding a first threshold; and
a difference between a first instant power delivery and one of the predicted regulation up capacity or the predicted regulation down capacity falling below a second threshold; and
disable the one of the second plurality of grid regulation resources from participating in the grid regulation service based on:
the grid characteristic falling below the first threshold; and
the difference between a second instant power delivery and one of the predicted regulation up capacity or the predicted regulation down capacity exceeding the second threshold.

11. The processing system of claim 10, wherein the indication comprises an instruction to commence the grid regulation service period received from one of: an independent system operator (ISO), a regional transmission organization (RTO), a transmission system operator (TSO), a distribution system operator (DSO), or a microgrid operator.

12. The processing system of claim 10, wherein the grid characteristic is a rate of change of a grid frequency.

13. The processing system of claim 12, wherein the one or more processors are further configured to cause the processing system to:
monitor the grid characteristic; and
generate the indication when the grid frequency:
exceeds a grid frequency upper limit, or
falls below a grid frequency lower limit.

14. The processing system of claim 10, wherein the one or more processors are further configured to cause the processing system to: transmit a command to the one of the second plurality of grid regulation resources through a respective electric vehicle supply equipment connected to the one of the second plurality of grid regulation resources.

15. A system for providing grid regulation services, the system comprising:
a memory comprising computer-executable instructions;
one or more processors configured to execute the computer-executable instructions and cause the system to:
receive, by the one or more processors, grid data from one of a grid or a grid operator,
receive, by the one or more processors, a first set of status data from a plurality of bidirectional resources, each of the plurality of bidirectional resources configured to enable bidirectional power flow to and from the grid;
receive, by the one or more processors, a second set of status data from a plurality of unidirectional resources, each of the plurality of unidirectional resources configured to facilitate unidirectional power flow from the grid to a respective energy storage device;
perform, by the one or more processors, a grid regulation service using exclusively the plurality of bidirectional resources;

comparing, by the one or more processors, one or more parameters from at least one of the grid data, the first set of status data, and the second set of status data to one or more thresholds during the grid regulation service;

responsive to at least one of the one or more parameters falling below or exceeding at least one of the one or more thresholds, supplementing the grid regulation service by controlling a rate of power delivery via at least one of the plurality of unidirectional resources; and responsive to each of the one or more parameters returning to within a desired operating range, disabling control of the rate of power delivery via the at least one of the plurality of unidirectional resources.

16. The system of claim 15, wherein the supplementing the grid regulation service further comprises controlling the rate of power delivery via two or more of the plurality of unidirectional resources.

17. The system of claim 15, wherein:

a first of the one or more parameters is a rate of change of a grid frequency, a second of the one or more parameters is a difference between a first instant power delivery and one of a predicted regulation up capacity or a predicted regulation down capacity, and the predicted regulation up capacity and the predicted regulation down capacity are each associated with the plurality of bidirectional resources.

18. The system of claim 15, wherein the one or more processors is further configured to control a power delivery rate of each of the plurality of bidirectional resources during the grid regulation service.

* * * * *